(12) United States Patent
Bohn et al.

(10) Patent No.: US 11,832,299 B2
(45) Date of Patent: Nov. 28, 2023

(54) EXTENDED RANGE DIRECT MODE ENHANCED CHANNEL ACCESS IN DIGITAL MOBILE RADIO SYSTEMS

(71) Applicant: MOTOROLA SOLUTIONS, INC., Chicago, IL (US)

(72) Inventors: Thomas B. Bohn, McHenry, IL (US); Piotr Ptasinski, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/869,377

(22) Filed: May 7, 2020

(65) Prior Publication Data
US 2020/0359413 A1   Nov. 12, 2020

Related U.S. Application Data

(60) Provisional application No. 62/845,392, filed on May 9, 2019.

(51) Int. Cl.
*H04W 74/04*   (2009.01)

(52) U.S. Cl.
CPC .................. *H04W 74/04* (2013.01)

(58) Field of Classification Search
CPC ....... H04W 4/10; H04W 74/04; H04W 76/18; H04W 76/38; H04W 76/45
See application file for complete search history.

(56) References Cited

U.S. PATENT DOCUMENTS

| | | | |
|---|---|---|---|
| 5,787,345 A * | 7/1998 | Moon ..................... | H04W 4/10 455/527 |
| 5,940,765 A * | 8/1999 | Haartsen .............. | H04B 7/2687 455/515 |

(Continued)

FOREIGN PATENT DOCUMENTS

| | | |
|---|---|---|
| EP | 3035762 A1 | 6/2016 |
| WO | 2010039633 A2 | 4/2010 |

OTHER PUBLICATIONS

International Search Report and Written Opinion for Application No. PCT/US2020/031923 dated Aug. 7, 2020 (14 pages).

(Continued)

*Primary Examiner* — Wutchung Chu
*Assistant Examiner* — Berhanu D Belete
(74) *Attorney, Agent, or Firm* — Michael Best & Friedrich LLP

(57) ABSTRACT

Systems and methods for extended range direct mode enhanced channel access in digital mobile radio systems. One example method for operating a portable communication device includes receiving a transmit request, and, responsive to receiving the transmit request, transmitting a single transmit burst including a source identifier identifying the portable communications device and starting an enhanced channel access timer. The method includes, when the enhanced channel access timer expires without receiving at least one from the group consisting of a receive idle burst and a receive burst, transmitting a signal based on the transmit request. The method includes, when a receive burst including a second source identifier is received while the enhanced channel access timer has not expired, responsive to receiving the receive burst, comparing the source identifier to the second source identifier. The method includes, (Continued)

responsive to determining that the second source identifier matches the source identifier, transmitting the signal.

16 Claims, 6 Drawing Sheets

(56) References Cited

U.S. PATENT DOCUMENTS

| | | | | |
|---|---|---|---|---|
| 7,711,319 B2* | 5/2010 | Namm | ............... | H04W 4/08 |
| | | | | 455/518 |
| 8,761,200 B2* | 6/2014 | Kliger | ............... | H04N 21/6118 |
| | | | | 370/468 |
| 9,100,988 B2* | 8/2015 | Vilmur | ............... | H04W 16/26 |
| 2004/0264421 A1* | 12/2004 | Sato | ............... | A61P 17/00 |
| | | | | 370/347 |
| 2006/0013188 A1* | 1/2006 | Wiatrowski | ............... | H04W 4/06 |
| | | | | 370/347 |
| 2006/0171351 A1* | 8/2006 | Wild | ............... | H04M 3/42221 |
| | | | | 370/328 |
| 2008/0207241 A1* | 8/2008 | Namm | ............... | H04W 8/186 |
| | | | | 455/518 |
| 2009/0077609 A1* | 3/2009 | Bichot | ............... | H04N 21/64322 |
| | | | | 725/127 |
| 2010/0085952 A1* | 4/2010 | Wiatrowski | ............... | H04B 7/15542 |
| | | | | 370/341 |
| 2010/0085953 A1* | 4/2010 | Patel | ............... | H04W 4/20 |
| | | | | 370/341 |
| 2010/0159975 A1* | 6/2010 | Shaffer | ............... | H04W 76/32 |
| | | | | 455/516 |
| 2010/0248654 A1* | 9/2010 | Keller | ............... | H04W 76/45 |
| | | | | 455/90.2 |
| 2011/0267939 A1* | 11/2011 | Streed | ............... | H04L 1/201 |
| | | | | 370/216 |
| 2014/0112242 A1* | 4/2014 | Vilmur | ............... | H04B 7/2606 |
| | | | | 370/327 |
| 2014/0328256 A1* | 11/2014 | Djukic | ............... | H04L 1/0045 |
| | | | | 370/329 |
| 2015/0365920 A1* | 12/2015 | Khoo | ............... | H04W 4/02 |
| | | | | 370/230 |
| 2016/0183307 A1* | 6/2016 | Xu | ............... | H04W 74/08 |
| | | | | 370/315 |
| 2018/0042064 A1* | 2/2018 | Norton | ............... | H04W 4/06 |
| 2019/0053299 A1* | 2/2019 | Wang | ............... | H04W 76/11 |

OTHER PUBLICATIONS

International Preliminary Report on Patentability and Written Opinion for Application No. PCT/US2020/031923 dated Nov. 18, 2021 (9 pages).
Australian Patent Office Examination Report No. 1 for Application No. 2020267579 dated Aug. 29, 2022 (4 pages).
Canadian Patent Office Action for Related Application No. 3137562 dated Jan. 3, 2023 (4 pages).

* cited by examiner

EXTENDED RANGE DIRECT MODE ENHANCED CHANNEL ACCESS IN DIGITAL MOBILE RADIO SYSTEMS

CROSS-REFERENCE TO RELATED APPLICATIONS

The present application is related to and claims benefit under 35 U.S.C. § 119(e) from U.S. Provisional Patent Application Ser. No. 62/845,392, filed May 9, 2019, titled "COLLISION DETECTION FOR EXTENDED RANGE DIRECT MODE ENHANCED CHANNEL ACCESS," the entire contents of which are incorporated herein by reference.

BACKGROUND OF THE INVENTION

Public safety and other organizations use portable communication devices (for example, portable two-way radios) to facilitate communication among their members. Voice and data communications are encoded and transmitted wirelessly between radios. However, portable two-way radios have a limited wireless range. To extend the range of these devices, the devices participate in a communications network transmit their signals through a repeater (for example, a single frequency repeater), which repeats the signal over a greater range.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
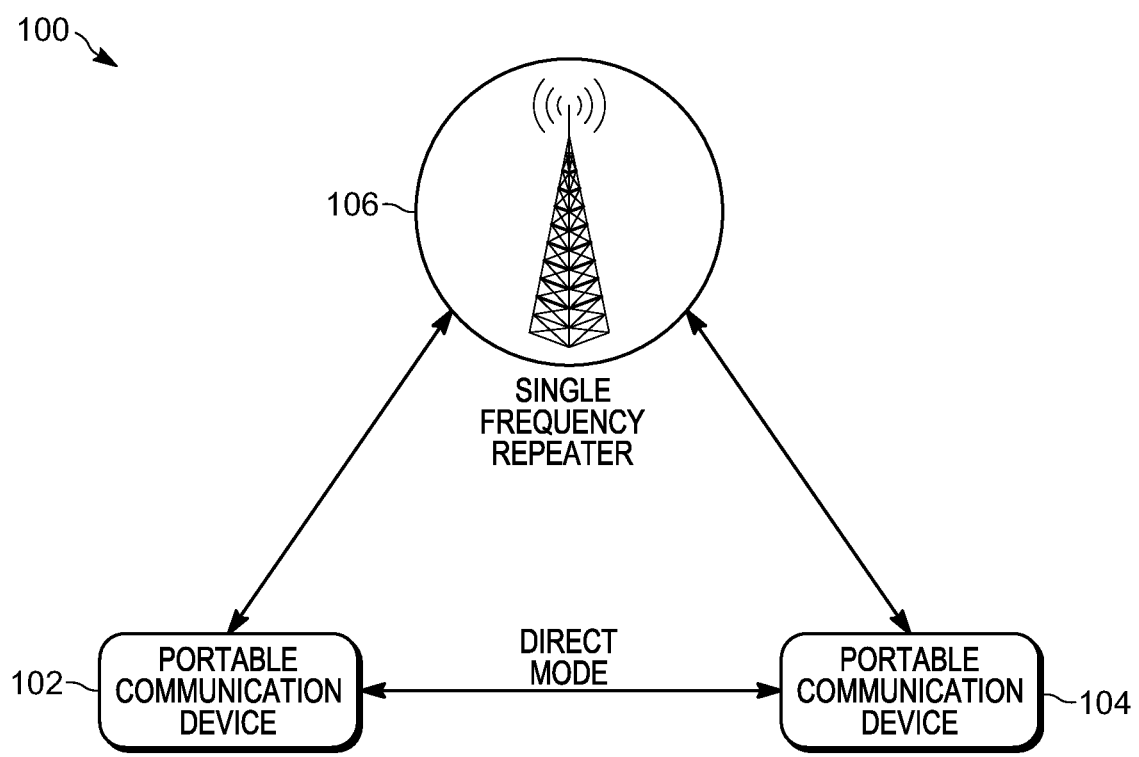
FIG. 1 illustrates a wireless communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted above, public safety and other organizations use portable communication devices (for example, portable two-way radios, converged devices, or data terminals) to support their operations. Some portable communication devices operate to communicate with one another in a direct mode (that is, wireless signals transmitted from one portable communication device are received directly by one or more other portable communication devices).

Some portable communication devices may operate through single frequency repeaters, which use a single frequency with an inbound time slot and an outbound timeslot to extend the range of the portable communication devices. Such portable communication devices transmit their signals in direct mode. If a repeater is in the vicinity (that is, near enough to receive the signal), the repeater would retransmit the signal from the transmitting portable communication device, on the same frequency as the portable communication devices but over a greater range. Because in such networks the portable communication devices and the repeater transmit on the same frequency using different time slots, receiving portable communication devices may receive both the signal from the transmitting portable communication device and the repeater. Therefore, the receiving portable communication devices include a receiving algorithm for selecting between multiple signals received nearly simultaneously. The receiving portable communication devices select the better of the received signals and use it for the remainder of the transmission. Therefore, some portable communication devices may receive a transmission (for example, a voice or data transmission) in direct mode, which other portable communication devices receive the same transmission in single frequency repeater mode.

The use of a single frequency repeater by multiple portable communication devices can lead to race conditions developing during operations. For example, one user may transmit a message asking a question, and many users may wish to respond with an answer. As multiple users transmit their answers at the same time, it can lead to one group of devices receiving one transmission, while another group of devices receives another transmission, leading to impaired communications. For example, two users may attempt at the same time to each transmit a different message to the other users of the network. As a consequence, some users receive one message, while other users receive the other message. However, the transmitting users believe their messages went through to the whole network, and neither group is aware that it missed one of the messages. To ensure effective communications among users of a wireless communication network, it is desirable that all receiving users receive the same transmission at the same time.

To address this problem, some communication networks operate using enhanced channel access to limit access to the repeater. Using enhanced channel access, when a user of a portable communication device attempts to transmit a message (for example, by activating a push-to-talk button), the portable communication device transmits a transmit burst that includes a source identifier for the portable communication device and listens for a reply. When the repeater receives this transmit burst, it repeats the transmit burst. If the portable communication device receives its repeated transmit burst, it determines that it has captured the repeater and proceeds with the user's transmission. If the portable communication device does not receive its own repeated transmit burst, or that of another portable communication device, it determines that it has not captured the repeater and denies the user's transmission.

When two or more portable communication devices send a transmit burst simultaneously, it results in a collision. A collision between two or more transmissions from portable communication devices may result in the repeater receiving a radiofrequency signal that is strong enough to be detected. However, the signal contains corrupted data as a result of the colliding transmissions. Because the repeater cannot decode the corrupted data, it does not retransmit a signal. Therefore, the portable communication devices creating the collision will not receive a transmit burst in response to their transmission. Portable communication devices operating using enhanced channel access are unable to determine whether the failure to receive their repeated transmit burst is the result of failing to capture the repeater, or a collision. As a result, they will proceed with their transmission. This can lead to multiple direct mode transmissions being received by different groups of portable communication devices within the network, which is one of the problems enhanced channel access was meant to solve. In communication systems with large numbers of devices (for example, thousands of radios operating on a single network), such collisions are more likely to occur and can lead to impaired communications and inefficient use of network resources. Sending and receiving data traffic may also lead to increased occurrences of such collisions because data transmissions may be very frequent and short compared to voice transmissions, also leading to impaired communications and inefficient use of network resources. Accordingly, systems and methods are provided herein for extended range direct mode enhanced channel access to support communications, with or without the presence of a repeater, in digital mobile radio systems.

Among other things, some embodiments provided herein use the transmission (by a repeater) and reception (by the portable communication devices) of idle bursts to account for collisions. For example, in some embodiments, a portable communication device may receive an idle burst after initiating transmission with a transmit burst. This idle burst indicates to the portable communication device that the repeater has not received and successfully decoded the transmit burst transmitted by the portable communication device (for example, because the transmit burst collided with another transmit burst). However, the portable communication device, because it has received the idle burst, knows the repeater is present and will continue attempting to communicate via the repeater with another transmit burst, rather than proceeding with a direct mode transmission. However, if the portable communication device fails to receive either a transmit burst or an idle burst, it may determine that there is no repeater present and proceed to transmit. Using such embodiments, portable communication devices are able to dynamically communicate in both repeater and direct mode, while reducing instances of disparate simultaneous transmissions. This, in turn, reduces communication disruptions and leads to more efficient use of the networks and their respective computing resources.

One example embodiment provides a portable communication device. The portable communication device includes a transceiver and an electronic processor coupled to the transceiver. The electronic processor is configured to receive a transmit request. The electronic processor is configured to, responsive to receiving the transmit request, control the transceiver to transmit a single transmit burst including a source identifier identifying the portable communications device and start an enhanced channel access timer. The electronic processor is configured to, when the enhanced channel access timer expires without the transceiver receiving at least one from the group consisting of an idle burst and a receive burst, control the transceiver to transmit a signal based on the transmit request. The electronic processor is configured to, when the transceiver receives a receive burst including a second source identifier while the enhanced channel access timer has not expired. The electronic processor is configured to, responsive to receiving the receive burst, compare the source identifier to the second source identifier. The electronic processor is configured to, responsive to determining that the second source identifier matches the source identifier, control the transceiver to transmit a signal based on the transmit request.

Another example embodiment provides a method for operating a portable communication device. The method includes receiving a transmit request. The method includes, responsive to receiving the transmit request, transmitting a single transmit burst including a source identifier identifying the portable communications device and starting an enhanced channel access timer. The method includes, when the enhanced channel access timer expires without receiving at least one from the group consisting of a receive idle burst and a receive burst, transmitting a signal based on the transmit request. The method includes, when a receive burst including a second source identifier is received while the enhanced channel access timer has not expired, responsive to receiving the receive burst, comparing the source identifier to the second source identifier. The method includes, responsive to determining that the second source identifier matches the source identifier, transmitting a signal based on the transmit request.

Another example embodiment provides a wireless communication system. The system includes a receiver, a transmitter, and an electronic processor coupled to the receiver and the transmitter. The electronic processor is configured to operate in a receive mode. The electronic processor is configured to, while operating in the receive mode, detect a first collision at the receiver. The electronic processor is configured to, responsive to detecting the first collision, start a beacon duration timer. The electronic processor is configured to, while the beacon duration timer has not expired, operate in a beaconing mode. The electronic processor is configured to, while operating in the beaconing mode, control the transmitter to periodically transmit an idle burst. The electronic processor is configured to detect a second collision at the receiver. The electronic processor is configured to, responsive to detecting the second collision, restart the beacon duration timer, and, when the beacon duration timer expires, operate in the receive mode.

For ease of description, some or all of the example devices and systems presented herein are illustrated with a single exemplar of each of its component parts. Some examples may not describe or illustrate all components of the devices and systems. Other example embodiments may include more or fewer of each of the illustrated components, may combine some components, or may include additional or alternative components.

FIG. 1 is a block diagram of an example wireless communication system 100. FIG. 1 shows one example of a network configuration, in which embodiments may be implemented; other configurations are possible. In the example shown, the system 100 includes a first portable communication device 102, a second portable communication device 104, and a single frequency repeater (SFR) 106. It should be understood that the system 100 is provided as an example and, in some embodiments, the system 100 includes additional components. For example, the system 100 may include multiple portable communication devices, multiple single frequency repeaters, or combinations thereof. In particular, it should be understood that although FIG. 1 illustrates only two portable communication devices, the system 100 may include tens, hundreds, or thousands of portable communication devices.

Embodiments are described herein in terms of portable communication devices (for example, two-way radios) transmitting voice transmission. It should be noted that the embodiments presented can also apply to portable or mobile communication devices used to transmit data, or combinations of voice and data. For example, some embodiments of the system 100 may include one or more data terminals (for example, data modems used for telemetry or other data transmission). The methods described herein may also apply to devices transmitting and receiving data communications, voice communications, or combinations of both.

In the illustrated embodiment, the system 100 is a land mobile radio (LMR) network. LMR systems are terrestrially based, wireless communications systems commonly used by federal, state, local, tribal, and territorial emergency responders, public works companies, and even the military to support voice and low-speed data communications. Such systems typically consist of handheld portable two-way radios; mobile two-way radios; data modems used to send and receive telemetry, location, and other types of data; base stations; a network; and repeaters. LMR systems provide two-way radio communications, typically in the VHF, UHF, 700 MHz, and 800 MHz frequency bands, for example, implemented in accordance with the Association of Public Safety Communications Officials (APCO) "Project 25" (P25) two-way radio communications protocol. In some embodiments, the system 100 may operate according to the Digital Private Mobile Radio (dPMR) standard defined by the European Telecommunication Standards Institute (ETSI), the Digital Mobile Radio (DMR) standard also defined by the ETSI, among other possibilities, and over which multimedia broadcast multicast services (MBMS), single site point-to-multipoint (SC-PTM) services, or Mission Critical Push-to-talk (MCPTT) services may be provided.

Figure 2:
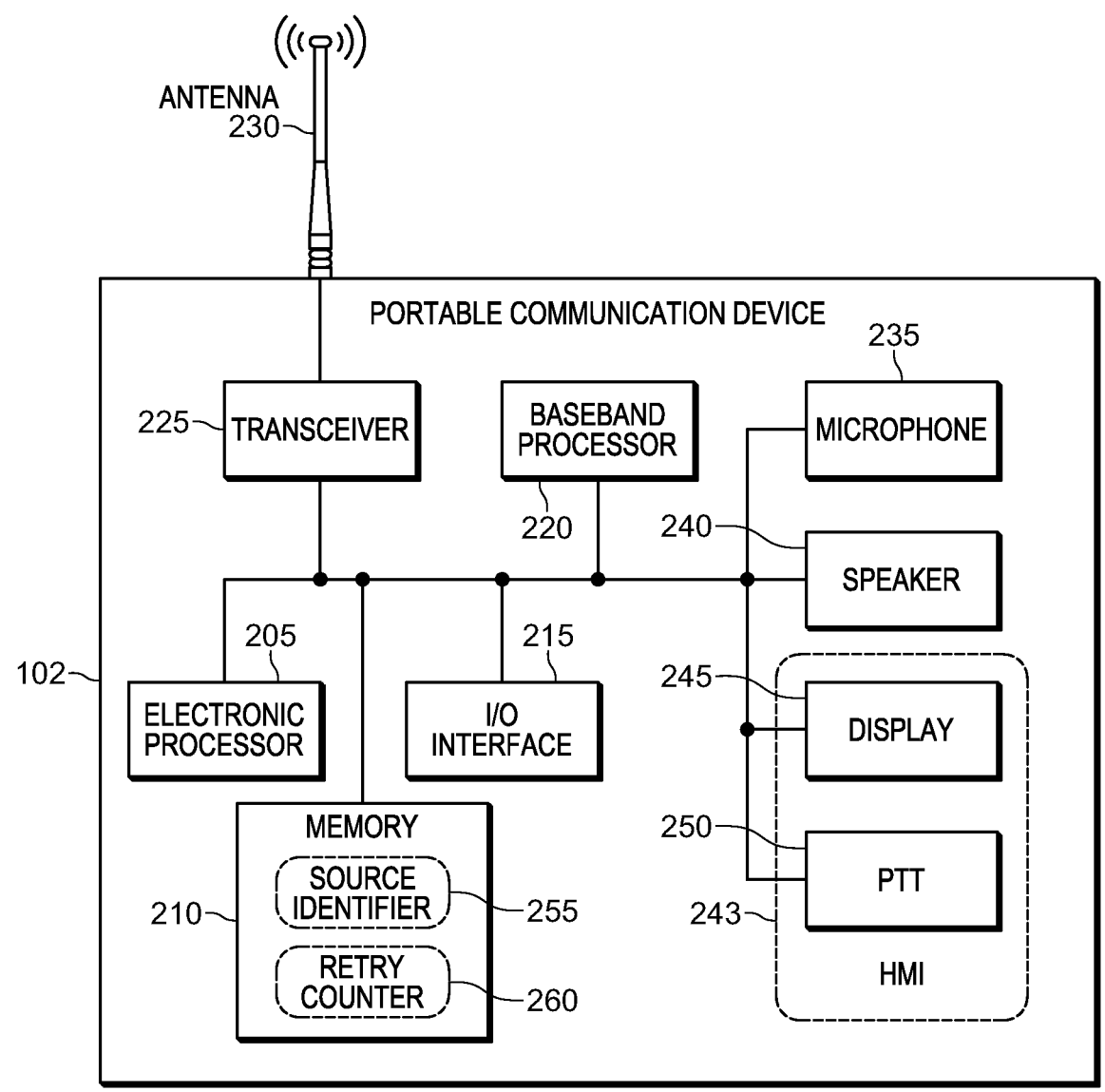
FIG. 2 schematically illustrates a portable communication device in accordance with some embodiments.

The first portable communication device 102, described more particularly herein with respect to FIG. 2, incorporates components (e.g., hardware and software) to permit communications via one or more communication modalities. For example, the first portable communication device 102 and the second portable communication device may communicate directly with each other and other portable communication devices (not shown) using a simplex channel. The first portable communication device 102 and the second portable communication device may also communicate with each other and other portable communication devices (not shown) using the single frequency repeater 106.

Figure 3:
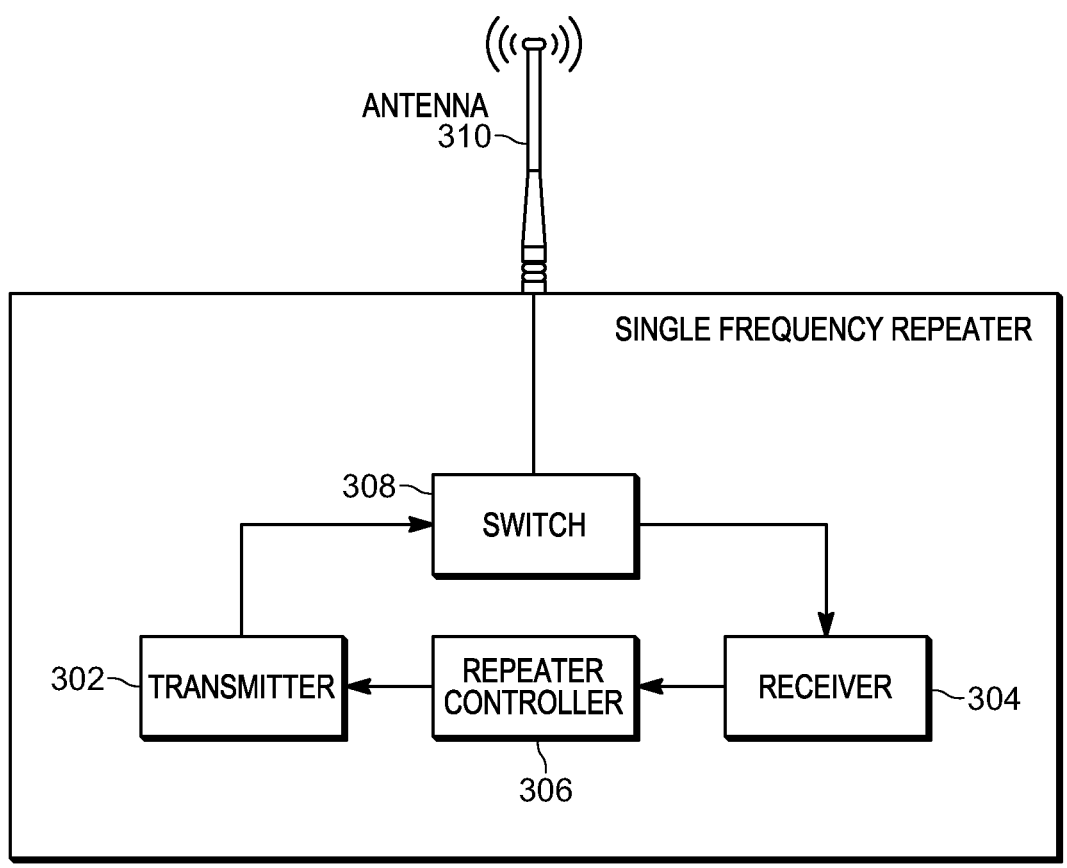
FIG. 3 schematically illustrates a single frequency repeater in accordance with some embodiments.

The single frequency repeater 106, described more particularly herein with respect to FIG. 3, receives a radiofrequency signal for example, from the first portable communication device 102, on a simplex channel, boosts the signal's power, and retransmits the signal on the simplex channel. For example, the first portable communication device 102 transmits a burst (for example, a DMR voice header, indicating a voice transmission request, or a control signaling block (CSBK) preamble, indicating data transmission request) identifying itself to the single frequency repeater 106 and requesting re-transmission. The single frequency repeater 106 retransmits the received burst to notify the first portable communication device 102 that it has captured the repeater and may begin sending its transmission for amplification and retransmission by the single frequency repeater 106.

As would be understood by one skilled in the art, FIG. 1 is a simplified diagram and wireless networks are more complex than the schematic elements depicted in FIG. 1.

FIG. 2 schematically illustrates one example embodiment of the first portable communication device 102. In the embodiment illustrated, the first portable communication device 102 includes an electronic processor 205, a memory 210, an input/output interface 215, a baseband processor 220, a transceiver 225, an antenna 230, a microphone 235, a speaker 240, and a human machine interface 243 (including a display 245 and a push-to-talk (PTT) selection mechanism 250). The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein. In some embodiments, the first portable communication device 102 includes fewer or additional components in configurations different from that illustrated in FIG. 2. The illustrated embodiment may be used for sending voice communications, data communications, or combinations of both.

The electronic processor 205 obtains and provides information (for example, from the memory 210 and/or the input/output interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein. The memory 210 can include one or more non-transitory computer-readable media, and includes a program storage area and a data storage area. The program storage area and the data storage area can include combinations of different types of memory, as described herein. In the embodiment illustrated, the memory 210 stores, among other things, a source identifier 255 and a retry counter 260 (both described in detail herein).

The input/output interface 215 is configured to receive input and to provide system output. The input/output interface 215 obtains information and signals from, and provides information and signals to, (for example, over one or more wired and/or wireless connections) devices both internal and external to the first portable communication device 102.

The electronic processor 205 is configured to control the baseband processor 220 and the transceiver 225 to transmit and receive radio frequency signals (for example, encoded with audio or other data) to and from the first portable communication device 102. The baseband processor 220 encodes and decodes digital data (including digitized audio signals) sent and received by the transceiver 225. In one example embodiment, the transceiver 225 is configured to transmit and receive DMR radio signals to and from, for example, the single frequency repeater 106 using the antenna 230.

The electronic processor 205, the baseband processor 220, and the transceiver 225 may include various digital and analog components (for example, digital signal processors, high band filters, low band filters, and the like), which for brevity are not described herein and which may be implemented in hardware, software, or a combination of both. In some embodiments, the transceiver 225 is a combined transmitter-receiver component. In other embodiments the transceiver 225 includes or may be replaced by separate transmitter and receiver components.

The microphone 235 is a transducer capable of sensing sound, converting the sound to electrical signals, and transmitting the electrical signals to the electronic processor 205. The electronic processor 205 processes the electrical signals received from the microphone 235 to produce an audio signal, which may be transmitted to other devices via the transceiver 225. The speaker 240 is a transducer for reproducing sound from electrical signals (for example, generated from a received audio signal) received from the electronic processor 205. In some embodiments, the microphone 235, the speaker 240, or both may be integrated in a single housing with the other components (for example, in a portable hand-held radio). In some embodiments, the microphone 235, the speaker 240, or both are present in an accessory device (for example, a remote speaker microphone (RSM) or headset) connect via a wired or wireless connection to the first portable communication device 102.

The HMI 243 includes the display 245 and the push-to-talk selection mechanism 250.

The display 245 is a suitable display, for example, a liquid crystal display (LCD) touch screen, or an organic light-emitting diode (OLED) touch screen. In some embodiments, the first portable communication device 102 implements a graphical user interface (GUI) (for example, generated by the electronic processor 205, from instructions and data stored in the memory 210, and presented on the display 245), that enables a user to interact with and control the first portable communication device 102.

The push-to-talk selection mechanism 250 allows a user of the first portable communication device 102 to initiate push-to-talk (including PTX) communications to one or more other communication devices. In some embodiments, the push-to-talk selection mechanism 250 is a mechanical button, key, switch, or knob. In some embodiments, the push-to-talk selection mechanism 250 is provided as part of a graphical user interface (for example, a virtual button) presented on the display 245.

The first portable communication device 102 may implement a land mobile radio (LMR) standard or protocol such as ETSI Digital Mobile Radio (DMR), or other LMR radio protocols or standards. The second portable communication device 104 includes similar components as described above, and is configured similarly to the first portable communication device 102.

FIG. 3 schematically illustrates one example embodiment of the single frequency repeater 106. In the embodiment illustrated, the single frequency repeater 106 is an electronic communications device including a transmitter 302, a receiver 304, a repeater controller 306, a switch 308, and an antenna 310, which along with other various modules and components, are coupled to each other by or through one or more control or data buses that enable communication therebetween. For ease of description, the single frequency repeater 106 illustrated in FIG. 3 includes a single transmitter 302, receiver 304, repeater controller 306, switch 308, and antenna 310. Alternative embodiments may include more or fewer of each of these components, may combine some components, or may include other alternative components. Some embodiments include components that perform multiple functions, for example, a transceiver and a transceiving antenna, instead of separate transmitting and receiving components.

The single frequency repeater 106 is configured for radiofrequency communication with the first portable communication device 102 and the second portable communication device 104 using a land mobile radio (LMR) standard or protocol such as ETSI Digital Mobile Radio (DMR), or other LMR radio protocols or standards. The single frequency repeater 106 is configured transmit (with the transmitter 302) and receive (with the receiver 304) using a simplex channel (that is, to transmit and receive using the same frequency using transmit and receive time slots). The repeater controller 306 is configured to receive wireless communication signals from, for example, the first portable communication device 102, via the antenna 310, the switch 308, and the receiver 304. The switch 308 is an electronic device that enables transmit and receive radiofrequency signals to travel in a single signal path to and from the antenna 310 and the transmitter 302 and the receiver 304. The switch 308 isolates radiofrequency power from the receiver 304 during the transmit time slot so as to not exceed the maximum input level to the receiver 304. In alternative embodiments, separate transmitting receiving antennas with proper isolation via horizontal and/or vertical separation are used. The repeater controller 306, operates as described herein to amplify and retransmit (for example, with a 90 ms delay) the received wireless communication signals to, for example, the second portable communication device 104 (and other two-way radios affiliated with the single frequency repeater 106) via the transmitter 302, the switch 308, and the antenna 310.

In one example embodiment, the repeater controller 306 is a microcontroller that includes at least an electronic processor (for example, a digital signal processor), a memory, and an input/output interface (including, for example, a data port). The electronic processor executes computer-readable instructions ("software") stored in the memory to control the single frequency repeater 106 as described herein.

Figure 4:
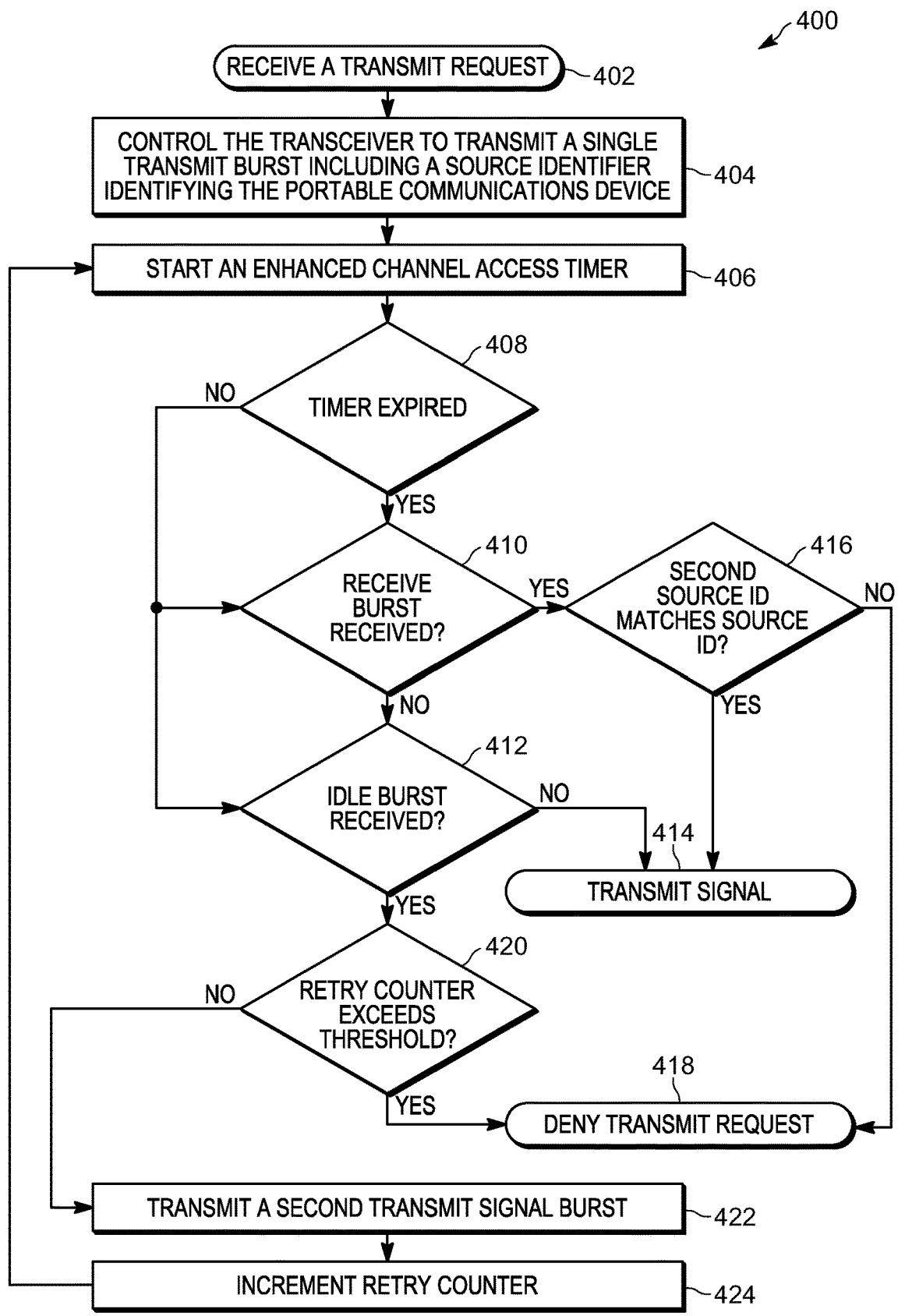
FIG. 4 is a flowchart illustrating a method for operating the portable communication device of FIG. 2 in accordance with some embodiments.

FIG. 4 illustrates an example method 400 for operating a portable communication device. Although the method 400 is described in conjunction with the system 100 as described herein, the method 400 could be used with other systems and devices. In addition, the method 400 may be modified or performed differently than the specific example provided.

As an example, the method 400 is described as being performed by the first portable communication device 102 and, in particular, the electronic processor 205. However, in some embodiments, portions or all of the method 400 may be performed by other devices. Additional electronic processors may also be included in the first portable communication device 102 that perform all or a portion of the method 400. For ease of description, the method 400 is described in terms of the first portable communication device 102 and the single frequency repeater 106. However, the method 400 may be applied to hundreds or thousands of devices operating across multiple repeaters.

At block 402, the method 400 begins with the first portable communication device 102 receiving a transmit request. For example, the transmit request may be a push-to-talk request (received via the human machine interface) for a voice transmission. In some embodiments, the transmit request may be a request to transmit data (for example, an automatic data transmission requested by the electronic processor 205 or a user-initiated request to transmit data). It should be noted that the description of the method 400 assumes that the first portable communication device 102 is operating in an idle mode, and therefore omits certain steps, for example, determining whether the channel is busy or idle.

Responsive to receiving the transmit request, the electronic processor 205, at block 404, after verifying that the channel is free and that there is no ongoing transmission, controls the transceiver 225 to transmit a single transmit burst including a source identifier identifying the portable communications device and, at block 406, starts an enhanced channel access timer. In some embodiments, the transmit burst is, for example, a digital mobile radio (DMR) voice header or a control signaling block (CSBK) preamble. The enhanced channel access timer is used to track the time between the transmission of the transmit burst and the reception, if any, of any subsequent radiofrequency signals. In some embodiments, the enhanced channel access timer is set to between 100 ms and 300 ms. For example, when the enhanced channel access timer is set to 200 ms, it starts at 0 ms and expires when 200 ms have elapsed.

At block 408, the electronic processor 205 determines whether the enhanced channel access timer has expired. When the enhanced channel access timer expires without the transceiver 225 receiving either a receive burst (at block 410) or an idle burst (at block 412), the electronic processor 205 determines that there is no repeater present and controls the transceiver 225 to transmit a signal based on the transmit request. For example, if the request was a push-to-talk activation, the transceiver 225 transmits an encoded voice message.

When the transceiver 225 receives a receive burst including a second source identifier (at block 410) while the timer has not expired (at block 410), the electronic processor 205, responsive to receiving the receive burst, at block 416 compares the source identifier to the second source identifier. The electronic processor responsive to determining that the second source identifier does not match the source identifier (at block 416), denies the transmit request at block 418. For example, in response to a push-to-talk transmit request, the electronic processor 205 may generate an audio signal using the speaker 240, a visual indicator on the display 245, or some other output to a user of the first portable communication device 102 indicating that the request to transmit was denied. In some embodiments, the electronic processor 205 controls the transceiver 225 to receive a signal based on the second source identifier until a call hangtime timer expires.

The electronic processor 205, responsive to determining that the second source identifier matches the source identifier (at block 416, the electronic processor, at block 414, controls the transceiver to transmit a signal based on the transmit request, as described above.

At block 412, when the first portable communication device 102 receives an idle burst while the enhanced channel access timer has not expired (at block 408), the electronic processor 205, responsive to receiving the idle burst, at block 420, determines whether a retry counter exceeds a retry threshold. The retry threshold indicates a maximum number of transmit bursts that the portable communication device will send before denying the transmit request. In some embodiments, the electronic processor 205 may receive interference or some other corrupted transmission, and, responsive to receiving such signals, at block 420, determine whether a retry counter exceeds a retry threshold.

The electronic processor 205, responsive to determining that the retry counter exceeds the retry threshold (at block 420), denies the transmit request at block 418.

The electronic processor 205, responsive to determining that the retry counter does not exceed the retry threshold (at block 420), controls the transceiver 225 to transmit a second transmit signal burst (at block 422), increments the retry counter (at block 424), and restarts the enhanced channel access timer (at block 406).

Figure 5:
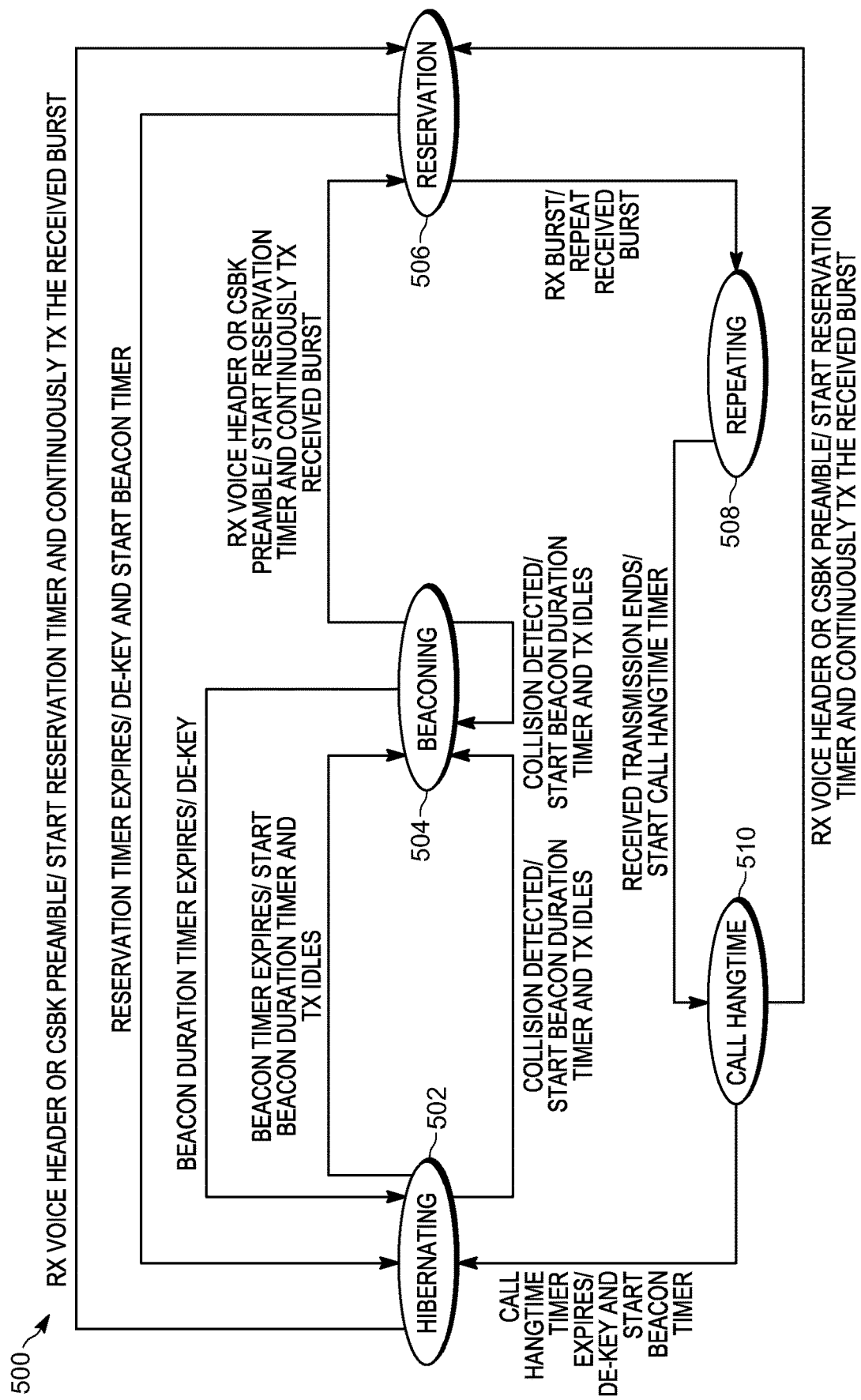
FIG. 5 is a state diagram illustrating a method for operating the single frequency repeater of FIG. 3 in accordance with some embodiments.

FIG. 5 is a state diagram illustrating an example method 500 for operating a single frequency repeater in conjunction with a portable communication device configured to operate according to the method 400 as described herein. Although the method 500 is described in conjunction with the system 100 as described herein, the method 500 could be used with other systems and devices. In addition, the method 500 may be modified or performed differently than the specific example provided.

As an example, the method 500 is described as being performed by the single frequency repeater 106 and, in particular, an electronic processor of the repeater controller 306. However, in some embodiments, portions or all of the method 500 may be performed by other devices. Additional electronic processors may also be included in the single frequency repeater 106 that perform all or a portion of the method 500. For ease of description, the method 500 is described in terms of the first portable communication device 102, the second portable communication device 104, and the single frequency repeater 106. However, the method 500 may be applied to hundreds or thousands of devices operating across multiple repeaters.

At block 502, the method 500 begins with the single frequency repeater 106 operating in a hibernating state 502. The hibernating state is a receive mode, where the receiver is listening for transmissions and the transmitter is not active.

The single frequency repeater 106 exits hibernating state 502 on one of three conditions.

In one condition, the electronic processor 205 receives a transmit burst from a portable communication device, as described herein with respect to FIG. 4. After receiving the transmit request, the repeater controller 306 controls the transmitter 302 to retransmit the burst, starts a reservation timer, retransmits the burst from the portable communication device, and enters a reservation state 506. If the reservation timer expires, before a transmission is received from the portable communication device with the reservation, the repeater controller 306 de-keys, starts a beacon timer, and re-enters the hibernating state 502.

If the receiver 304 receives a transmission from the portable communication device before the reservation time expires, the repeater controller 306 enters the repeating state 508 and repeats the received transmission. When the received transmission ends, the repeater controller 306 starts a call hangtime timer and moves from the repeating state 508 to a call hangtime state 510. While in the call hangtime state 510, the repeater is still reserved until the call hangtime timer expires. If another transmit burst is received before the call hangtime timer expires, the repeater controller 306 controls the transmitter 302 to retransmit the burst, starts a reservation timer, and enters a reservation state 506. If nothing is received prior to the expiration of the call hangtime timer, the repeater controller 306 returns to the hibernating state 502.

A second condition that causes the single frequency repeater 106 to exit the hibernation state is when the repeater controller 306 detects a collision at the receiver (for example, using the method 600 described herein). The repeater controller 306, responsive to detecting the collision, starts a beacon duration timer. While the beacon duration timer has not expired, the single frequency repeater 106 enters a beaconing state 504. While operating in the beaconing state (also referred to herein as a beaconing mode), the repeater controller 306 controls the transmitter to periodically transmit an idle burst. In some embodiments, the idle bursts are digital mobile radio idle messages, each including an embedded sync pattern. The idle bursts enable all portable communication devices in the system 100 to transmit with the same slot timing. For example, in some embodiments, the portable communication devices are configured to transmit their transmit bursts offset 30 ms from the last received idle burst.

When the beacon duration timer expires, the repeater controller 306 de-keys the transmitter 302, exits the beaconing state 504, and re-enters the hibernating state 502. However, if, while in the beaconing state 504, a transmit burst is received, the repeater controller 306 controls the transmitter 302 to exit the beaconing state 504, retransmit the burst, start a reservation timer, and enter the reservation state 506. If, while in the beaconing state 504, the repeater controller 306 detects a collision at the receiver 304, the repeater controller 306 restarts the beacon duration timer, and remains in the beaconing state 504 (continuing the transmit periodic idle bursts) until the beacon duration timer expires.

A third condition that causes the single frequency repeater 106 to exit the hibernating state 502 is when a beacon timer expires. The beacon timer tracks beacon intervals. In some embodiments, beacon timer is between zero and 300 seconds. When the beacon timer expires, the repeater controller 306 starts the beacon duration timer, and enters the beaconing state 504.

Figure 6:
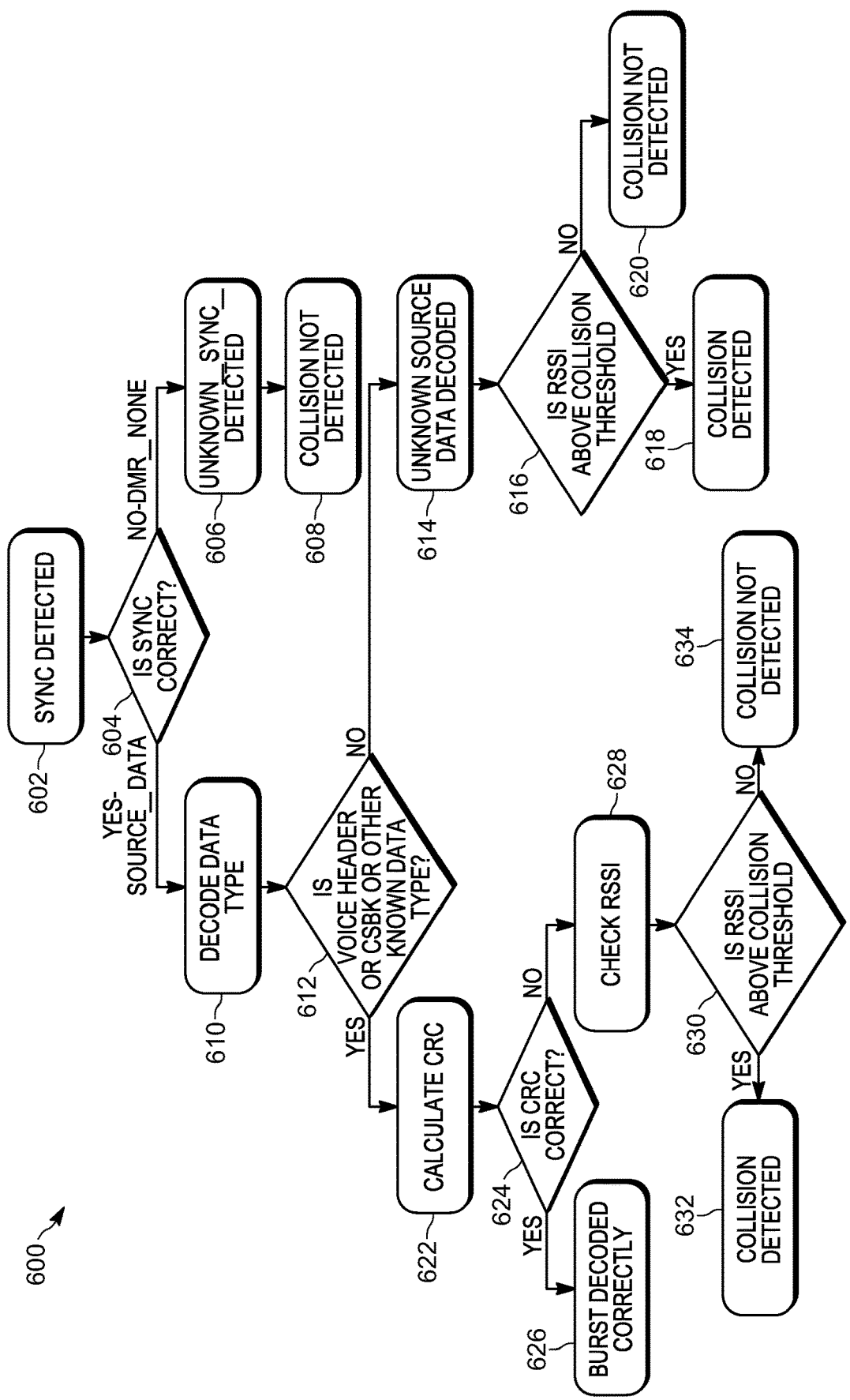
FIG. 6 is a flowchart illustrating a method for operating the single frequency repeater of FIG. 3 to detect collisions in accordance with some embodiments.

As described herein with respect to FIGS. 4 and 5, the single frequency repeater 106 is configured to detect collisions and transmit idle bursts in response. FIG. 6 is a flow chart illustrating an example method 600 used by the single frequency repeater 106 to detect collisions. Although the method 600 is described in conjunction with the system 100 as described herein, the method 600 could be used with other systems and devices. In addition, the method 600 may be modified or performed differently than the specific example provided.

As an example, the method 600 is described as being performed by the single frequency repeater 106 and, in particular, an electronic processor of the repeater controller 306. However, in some embodiments, portions or all of the method 600 may be performed by other devices. Additional electronic processors may also be included in the single frequency repeater 106 that perform all or a portion of the method 600. For ease of description, the method 600 is described in terms of the first portable communication device 102, the second portable communication device 104, and the single frequency repeater 106. However, the method 600 may be applied to hundreds or thousands of devices operating across multiple repeaters.

The method 600 begins, at block 602, with the single frequency repeater receiving, via the receiver 304, a radiofrequency signal including a sync pattern and a data portion.

At block 604, the repeater controller 306 determines whether the sync pattern is a digital mobile radio sync pattern. When the sync pattern is not a digital mobile radio pattern (at block 606), the repeater controller 306 determines, at block 608, that the received radiofrequency signal was not the result of a collision (and may be, for example, noise), and resumes listening at the receiver 304 for more radiofrequency signals.

At block 610, responsive to determining that the sync pattern is a digital mobile radio sync pattern (at block 604), the repeater controller 306 determines a data type for the data portion. For example, the repeater controller 306 may decode the digital data portion of the signal to identify the data type.

At block 612, the repeater controller 306 compares the decoded data portion to a plurality of known data types to determine whether the data type is one of the plurality of known data types. In some embodiments, the plurality of known data types includes a digital mobile radio (DMR) voice header, a control signaling block (CSBK) preamble, and other DMR data types.

A collision between two or more transmissions from portable communication devices results in a radiofrequency signal that is strong enough to be received and decoded, but contains corrupted data as a result of the colliding transmissions. To differentiate between signals caused by a collision and signals that are too weak to convey their data (for example, from a portable communication device that is out of range or obstructed), a collision threshold is used. The collision threshold is an RSSI value. The collision threshold is set such that radiofrequency signals with an RSSI value below the collision threshold are too weak to be the result of a collision between two or more transmissions from portable communication devices in range of the single frequency repeater 106. Similarly, radiofrequency signals with an RSSI value below the collision threshold are strong enough to be the result of a collision between two or more transmissions from portable communication devices within range of the single frequency repeater 106. Accordingly, responsive to determining that the data type is not one of a plurality of known data types (at block 614), the repeater controller 306 compares the received signal strength indicator (RSSI) value for the radiofrequency signal to a collision threshold.

When, at block 616, the RSSI value for the radiofrequency signal does not exceed the collision threshold, the repeater controller 306 determines, at block 620, that the received radiofrequency signal was not the result of a collision (and may be, for example, noise) and resumes listening at the receiver 304 for more radiofrequency signals.

At block 616, when the RSSI value exceeds the collision threshold, the repeater controller 306 indicates that a collision was detected (for example, by setting flag, using a software interrupt, sending a collision detection message to an appropriate software routine of the repeater controller 306, and the like). In response to detecting the collision, the repeater controller 306 transmits idle bursts, as described herein.

Responsive to determining that the data type is one of a plurality of known data types (at block 612), at block 622, the repeater controller 306 performs a cyclical redundancy check (CRC) on the data portion of the received signal.

When the CRC succeeds (indicating that the data is not corrupted) at block 624, the repeater controller 306 determines that the received radiofrequency signal was not the result of a collision and was decoded correctly, at block 626. The received radiofrequency signal is then processed according to the usual operations of the repeater controller 306 (for example, it is retransmitted).

Responsive to the cyclical redundancy failing (at block 624), the repeater controller 306, at blocks 628, compares a received signal strength indicator value for the radiofrequency signal to the collision threshold. When the received signal strength indicator value exceeds the collision threshold (at block 630), the repeater controller 306, at block 632, indicates that a collision was detected (for example, by setting flag, using a software interrupt, sending a collision detection message to an appropriate software routine of the repeater controller 306, and the like). In response to detecting the collision, the repeater controller 306 transmits idle bursts, as described herein.

When the RSSI value for the radiofrequency signal does not exceed the collision threshold (at block 630), the repeater controller 306 determines, at block 634, that the received radiofrequency signal was not the result of a collision (and may be, for example, noise) and resumes listening at the receiver 304 for more radiofrequency signals.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

It should also be understood that although certain examples depict components as logically separate, such depiction is merely for illustrative purposes. In some embodiments, the illustrated components may be combined or divided into separate software, firmware and/or hardware. Regardless of how they are combined or divided, these components may be executed on the same computing device or may be distributed among different computing devices connected by one or more networks or other suitable communication means.

In addition, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A portable communication device of a land mobile radio communication network, the portable communication device comprising: a transceiver; and an electronic processor coupled to the transceiver, and configured to receive a land mobile radio communication transmit request at a first frequency, the land mobile radio communication transmit request being a request to transmit one selected from the group consisting of a voice transmission and a data transmission originating from the portable communication device; responsive to receiving the transmit request, control the transceiver to transmit, at the first frequency, a single transmit burst including a source identifier identifying the portable communications device and start an enhanced channel access timer; when the enhanced channel access timer expires without the transceiver receiving, at the first frequency, at least one from the group consisting of an idle burst and a receive burst, control the transceiver to transmit, at the first frequency, a signal based on the transmit request; and when the transceiver receives a receive burst including a second source identifier while the enhanced channel access timer has not expired, responsive to receiving the receive burst, compare the source identifier to the second source identifier; and responsive to determining that the second source identifier matches the source identifier, control the transceiver to transmit, at the first frequency, the signal based on the transmit request.

2. The portable communication device of claim 1, wherein the electronic processor is further configured to: receive an idle burst while the enhanced channel access timer has not expired; responsive to receiving the idle burst, determine whether a retry counter exceeds a retry threshold; responsive to determining that the retry counter does not exceed the retry threshold, control the transceiver to transmit a second transmit signal burst, increment the retry counter, and restart the enhanced channel access timer; and responsive to determining that the retry counter exceeds the retry threshold, deny the transmit request.

3. The portable communication device of claim 1, wherein the electronic processor is further configured to, responsive to determining that the second source identifier does not match the source identifier, deny the transmit request.

4. The portable communication device of claim 3, wherein the electronic processor is further configured to, in response to determining that the second source identifier does not match the source identifier, control the transceiver to receive a signal based on the second source identifier until a call hangtime timer expires.

5. The portable communication device of claim 1, wherein the transceiver is configured to receive a plurality of receive idle bursts at a beacon interval; and the electronic processor is further configured to control the transceiver to transmit the single transmit burst offset 30 ms from the last received of the plurality of receive idle bursts.

6. The portable communication device of claim 5, wherein the plurality of receive idle bursts is a plurality of digital mobile radio idle messages, each including an embedded sync pattern.

7. The portable communication device of claim 1, wherein the electronic processor is configured to control the transceiver to transmit a single transmit burst by controlling the transceiver to transmit one selected from the group consisting of a voice header and a control signaling block (CSBK) preamble.

8. The portable communication device of claim 1, further comprising: a human machine interface; wherein the electronic processor is coupled to the human machine interface and configured to receive the transmit request via the human machine interface.

9. A method for operating a portable communication device of a land mobile radio communication network, the method comprising: receiving a land mobile radio communication transmit request at a first frequency, the land mobile radio communication transmit request being a request to transmit one selected from the group consisting of a voice transmission and a data transmission originating from the portable communication device; responsive to receiving the transmit request, transmitting, at the first frequency, a single transmit burst including a source identifier identifying the portable communications device and starting an enhanced channel access timer; when the enhanced channel access timer expires without receiving, at the first frequency, at least one from the group consisting of a receive idle burst and a receive burst, transmitting, at the first frequency, a signal based on the transmit request; and when a receive burst including a second source identifier is received while the enhanced channel access timer has not expired, responsive to receiving the receive burst, comparing the source identifier to the second source identifier; and responsive to determining that the second source identifier matches the source identifier, transmitting, at the first frequency, the signal based on the transmit request.

10. The method of claim 9, further comprising: receiving an idle burst while the enhanced channel access timer has not expired; responsive to receiving the idle burst, determining whether a retry counter exceeds a retry threshold; responsive to determining that the retry counter does not exceed the retry threshold, transmitting a second single transmit burst, incrementing the retry counter, and restarting the enhanced channel access timer; and responsive to determining that the retry counter exceeds the retry threshold, denying the transmit request.

11. The method of claim 9, further comprising: responsive to determining that the second source identifier does not match the source identifier, denying the transmit request.

12. The method of claim 11, further comprising: responsive to determining that the second source identifier does not match the source identifier, receiving a signal based on the second source identifier until a call hangtime timer expires.

13. The method of claim 9, wherein transmitting the single transmit burst includes transmitting the single transmit burst at a first frequency; receiving the receive burst includes receiving the receive burst at the first frequency; and transmitting the signal based on the transmit request includes transmitting the signal at the first frequency.

14. The method of claim 9, further comprising: receiving a plurality of receive idle bursts at a beacon interval; and transmitting the single transmit burst offset 30 ms from the last received of the plurality of receive idle bursts.

15. The method of claim 14, wherein receiving a plurality of receive idle bursts includes receiving a plurality of digital mobile radio idle messages, each including an embedded sync pattern.

16. The method of claim 9, wherein transmitting a single transmit burst includes transmitting one selected from the group consisting of a voice header and a control signaling block (CSBK) preamble.

* * * * *